(12) United States Patent
Poole et al.

(10) Patent No.: US 12,613,352 B2

(45) Date of Patent: Apr. 28, 2026

(54) SEISMIC DATA PROCESSING USING A DOWN-GOING ANNIHILATION OPERATOR

(71) Applicant: CGG SERVICES SAS, Massy Cedex (FR)

(72) Inventors: Gordon Poole, East Grinstead (GB); Ross Haacke, Reigate (GB)

(73) Assignee: CGG SERVICES SAS, Massy Cedex (FR)

( * ) Notice: Subject to any disclaimer, the term of this patent is extended or adjusted under 35 U.S.C. 154(b) by 515 days.

(21) Appl. No.: 17/705,997

(22) Filed: Mar. 28, 2022

(65) Prior Publication Data

US 2022/0326404 A1 Oct. 13, 2022

Related U.S. Application Data

(60) Provisional application No. 63/302,664, filed on Jan. 25, 2022, provisional application No. 63/167,852, filed on Mar. 30, 2021.

(51) Int. Cl.
*G01V 1/32* (2006.01)

(52) U.S. Cl.
CPC ........ *G01V 1/325* (2013.01); *G01V 2210/144* (2013.01); *G01V 2210/56* (2013.01)

(58) Field of Classification Search
CPC .... G01V 1/28; G01V 1/325; G01V 2210/144; G01V 2210/56
See application file for complete search history.

(56) References Cited

U.S. PATENT DOCUMENTS

| | | | |
|---|---|---|---|
| 2010/0246324 A1* | 9/2010 | Dragoset, Jr. ............ | G01V 1/36 367/24 |
| 2012/0026830 A1* | 2/2012 | Wang ....................... | G01V 1/38 367/24 |
| 2015/0109881 A1 | 4/2015 | Poole et al. | |
| 2015/0212222 A1* | 7/2015 | Poole ..................... | G01V 1/282 702/14 |
| 2017/0248716 A1 | 8/2017 | Poole | |
| 2019/0018157 A1 | 1/2019 | Robertsson et al. | |

(Continued)

FOREIGN PATENT DOCUMENTS

| | | |
|---|---|---|
| EP | 4107552 A1 | 12/2022 |
| GB | 2384053 B | 9/2005 |

(Continued)

OTHER PUBLICATIONS

Zhao Y, Liu T, Tang G, Zhang H, Sengupta M. Virtual-source imaging and repeatability for complex near surface. Sci Rep. Nov. 13, 2019;9(1):16656. doi: 10.1038/s41598-019-53146-w. PMID: 31723188; PMCID: PMC6853880. (Year: 2019).*

(Continued)

*Primary Examiner* — Yoshihisa Ishizuka
(74) *Attorney, Agent, or Firm* — PATENT PORTFOLIO BUILDERS PLLC

(57) ABSTRACT

Methods and seismic data processing apparatuses use a down-going annihilation operator to generate an image from seismic data acquired over a water-covered subsurface formation. The down-going annihilation operator is derived using a down-going wavefield and an estimated water-wave extracted from the seismic data. The down-going annihilation operator may be derived in plane-wave domain.

20 Claims, 11 Drawing Sheets

(56) References Cited

U.S. PATENT DOCUMENTS

2023/0077945 A1\*   3/2023   Dawson ................... G01V 1/36
                                                          702/16

FOREIGN PATENT DOCUMENTS

WO        2010117499 A2    10/2010
WO        2021167865 A1     8/2021

OTHER PUBLICATIONS

Ordonez, Alba, Soellner, Walter, and Tilman Kluever. "Imaging the total wavefields by reflectivity inversion using amplitude-normalized wavefield decomposition: Field data example." Paper presented at the 2016 SEG International Exposition and Annual Meeting, Dallas, Texas, Oct. 2016. (Year: 2016).\*

Search Report in corresponding/related GB Application No. 2204526.4 dated Jul. 29, 2022.

A. Ziolkowski et al., "The signature of an air gun array: Computation from near-field measurements including interactions," Geophysics, Oct. 1982, vol. 47, No. 10, pp. 1413-1421.

Are Osen et al., "Removal of water-layer multiples from multicomponent sea-bottom data," Geophysics, May-Jun. 1999, vol. 64, No. 3, pp. 838-851.

C.M. Davison et al., "Far-field Source Signature Reconstruction Using Direct Arrival Data," Th N116 15, 77th EAGE Conference & Exhibition Madrid 2015, Jun. 1-4, 2015, 5 pages.

Dmitri Lokshtanov, "Suppression of Free-Surface Effects From Multicomponent Sea-Floor Data," EAGE 62nd Conference and Technical Exhibition—Glasgow, Scotland, May 29-Jun. 2, 2000, 4 pages.

G. Hampson et al., "Down/down deconvolution," EAGE SB11, Sep. 8-10, 2020, EAGE Seabed Seismic Today: From Acquisition to Application, Online, 5 pages.

Lasse Amundsen et al., "Multidimensional signature deconvolution and free-surface multiple elimination of marine multicomponent ocean-bottom seismic data," Geophysics, Sep.-Oct. 2001, vol. 66, No. 5, pp. 1594-1604.

Lasse Amundsen, "Elimination of free-surface related multiples without the need of the source wavelet," Geophysics, Jan.-Feb. 2001, vol. 66, No. 1, pp. 327-341.

Lasse Amundsen, "Wavenumber-based filtering of marine point-source data," Geophysics, Sep. 1993, vol. 58, No. 9, pp. 1335-1348.

Orhan Yilmaz et al., "Discrete plane-wave decomposition by least-mean-square-error method," Geophysics, Jun. 1994, vol. 59, No. 6, pp. 973-982.

P. Caprioli et al., "Data-Driven Prediction of Downgoing Freesurface Multiples for Ocean-Bottom Node Data," 2021 82nd EAGE Annual Conference & Exhibition, Amsterdam, The Netherlands.

Sven Treitel et al., "Plane-wave decomposition of seismograms," Geophysics, Oct. 1982, vol. 47, No. 10, pp. 1375-1401.

Yi Wang et al., "The ups and downs of ocean-bottom seismic processing: Applications of wavefield separation and up-down deconvolution," Oct. 2010, The Leading Edge, pp. 1258-1265.

Search Report in corresponding/related British Application No. 2204526.4 dated Aug. 1, 2024.

Search Report in corresponding/related British Application No. 2204526.4 dated Jul. 4, 2024.

Arthur B. Weglein et al., "An inverse-scattering series method for attenuating multiples in seismic reflection data," Geophysics, Nov.-Dec. 1997, vol. 62, No. 6, pp. 1975-1989.

\* cited by examiner

FIGURE 6

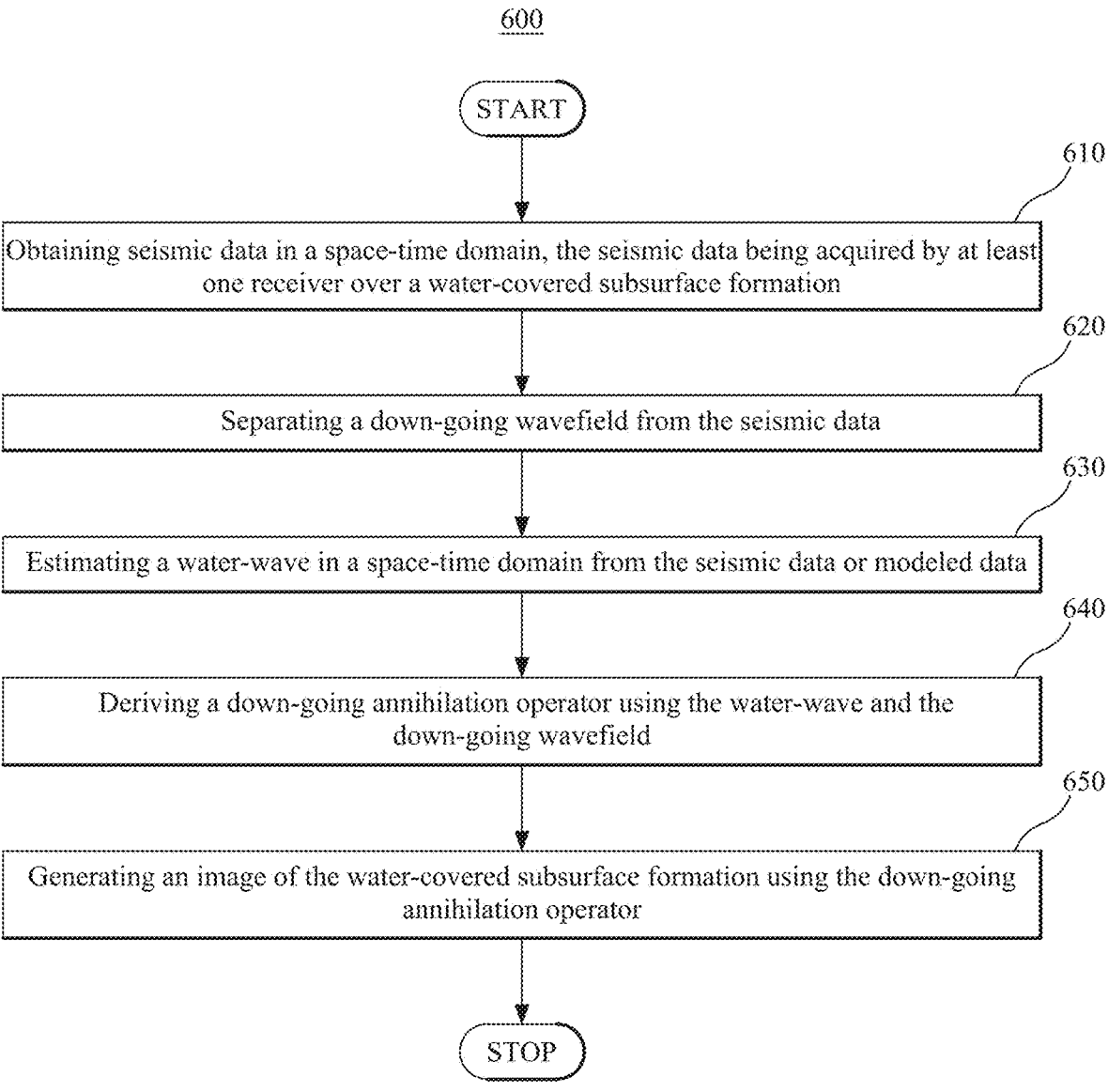

600

START

610

Obtaining seismic data in a space-time domain, the seismic data being acquired by at least one receiver over a water-covered subsurface formation

620

Separating a down-going wavefield from the seismic data

630

Estimating a water-wave in a space-time domain from the seismic data or modeled data

640

Deriving a down-going annihilation operator using the water-wave and the down-going wavefield

650

Generating an image of the water-covered subsurface formation using the down-going annihilation operator

STOP

FIGURE 7

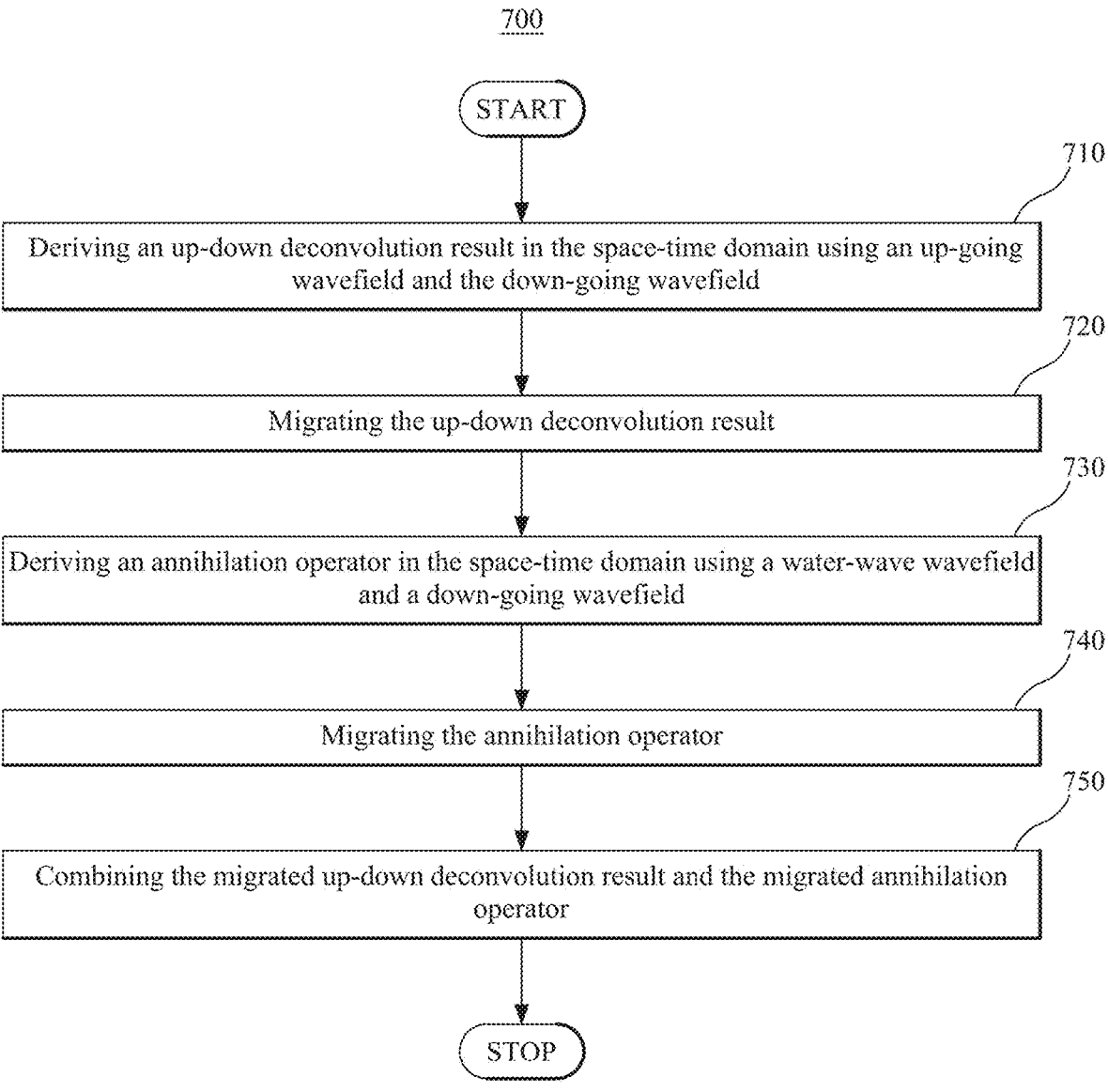

700

START

710

Deriving an up-down deconvolution result in the space-time domain using an up-going wavefield and the down-going wavefield

720

Migrating the up-down deconvolution result

730

Deriving an annihilation operator in the space-time domain using a water-wave wavefield and a down-going wavefield

740

Migrating the annihilation operator

750

Combining the migrated up-down deconvolution result and the migrated annihilation operator

STOP

FIGURE 8

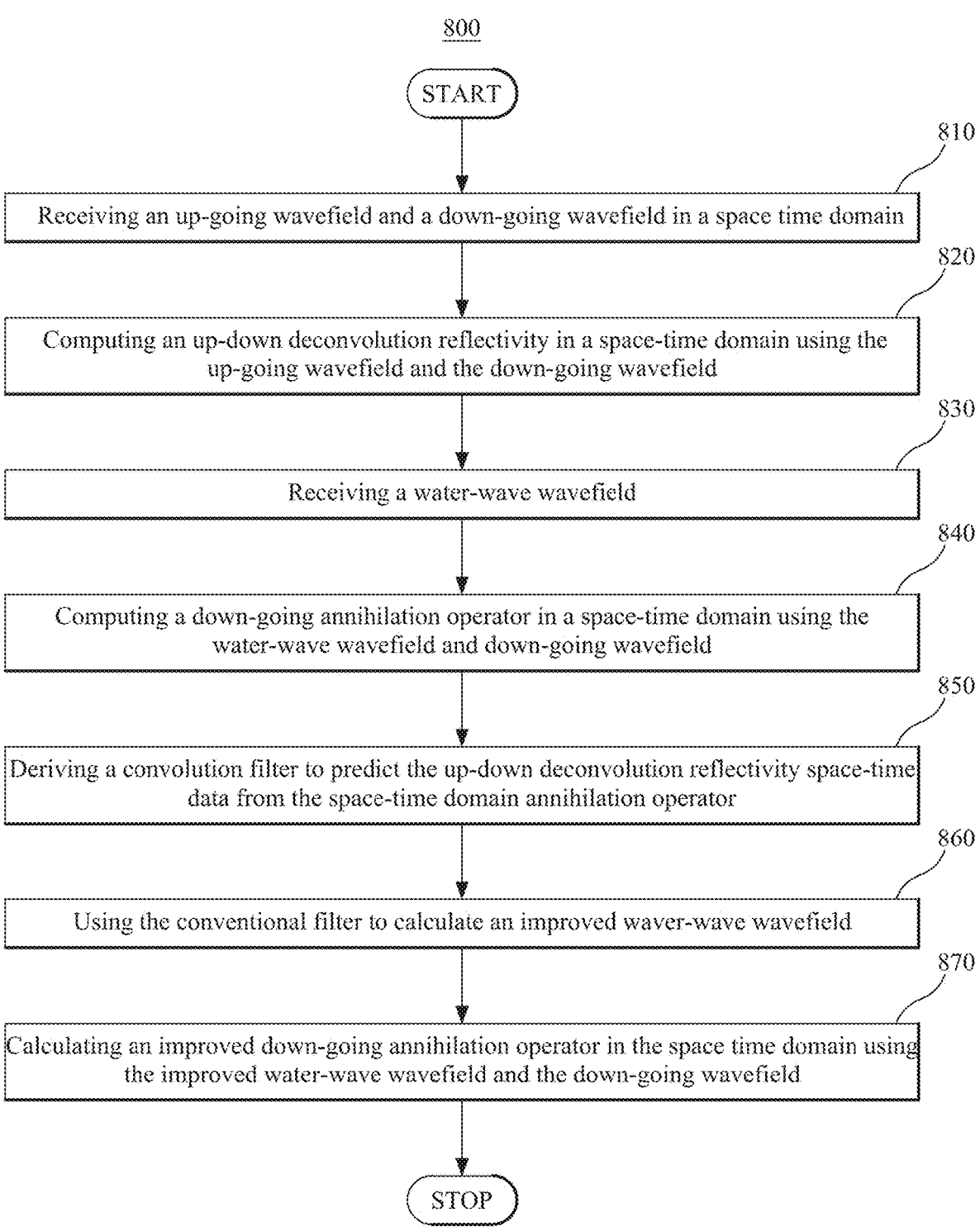

800

START

810

Receiving an up-going wavefield and a down-going wavefield in a space time domain

820

Computing an up-down deconvolution reflectivity in a space-time domain using the up-going wavefield and the down-going wavefield

830

Receiving a water-wave wavefield

840

Computing a down-going annihilation operator in a space-time domain using the water-wave wavefield and down-going wavefield

850

Deriving a convolution filter to predict the up-down deconvolution reflectivity space-time data from the space-time domain annihilation operator

860

Using the conventional filter to calculate an improved waver-wave wavefield

870

Calculating an improved down-going annihilation operator in the space time domain using the improved water-wave wavefield and the down-going wavefield

STOP

FIGURE 11

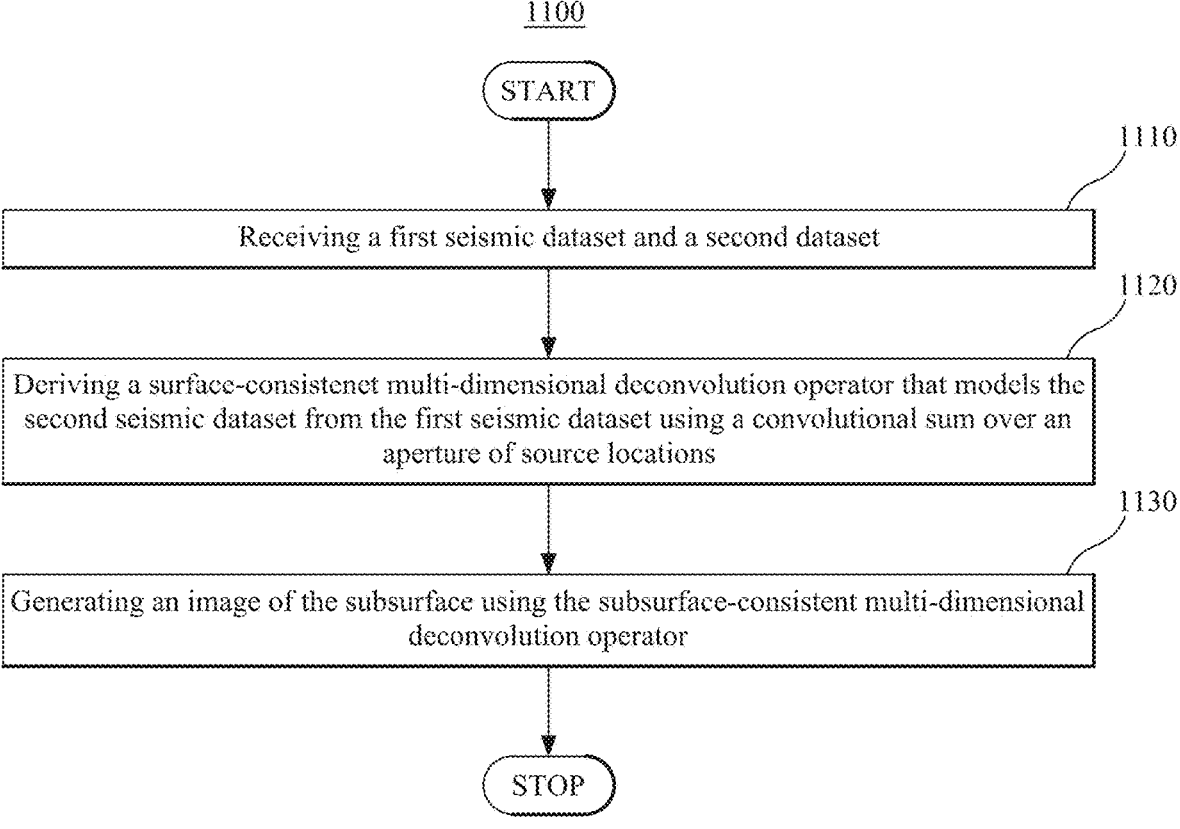

1100

START

1110

Receiving a first seismic dataset and a second dataset

1120

Deriving a surface-consistenct multi-dimensional deconvolution operator that models the second seismic dataset from the first seismic dataset using a convolutional sum over an aperture of source locations

1130

Generating an image of the subsurface using the subsurface-consistent multi-dimensional deconvolution operator

STOP

1200

SEISMIC DATA PROCESSING USING A DOWN-GOING ANNIHILATION OPERATOR

TECHNICAL FIELD

Embodiments of the subject matter disclosed herein generally relate to seismic data processing methods and systems that employ a down-going annihilation operator in processing seismic data to generate images of explored underground formations.

DISCUSSION OF THE BACKGROUND

Seismic surveys are frequently employed to explore presence and location of underground resources. In order to generate an accurate image of an explored subsurface formation based on seismic data, data acquired on land or in the marine environment has to be aggregated to account for source and detecting sensor positions and converted from time to depth. In seismic data processing, effects of interfaces (e.g., surface multiples, ghost effects), data acquisition instrumentation (e.g., signature shaping effects), noise etc. are removed or at least minimized to avoid obscuring or altering structural features of the subsurface formation. The huge volumes of data acquired during a seismic survey are thus reduced to three-dimensional (3D) images useable to assess whether and where subsurface resources (such as hydrocarbons, mineral deposits, geothermal resources, etc.) are present in the explored subsurface formation. The images may represent seismic wave propagation velocity values throughout the subsurface formation, or reflectivity values and location of interfaces between volumes having different acoustic impedance values (known as the subsurface formation's velocity image and reflectivity image, respectively). More generally, a subsurface image is a 3D map of values a physical attribute.

Seismic data processing may employ the up-down deconvolution (UDD) technique described in the 2001 article "Elimination of free-surface related multiples without the need of the source wavelet" by L. Amundsen published in *Geophysics* No. 66(1), pp. 327-341, to achieve the above-mentioned objectives. This technique is applied to seismic recordings at sea, where the sources are above the seismic sensors (often called "receivers"). The sensors may be located at the water-bottom (e.g., ocean bottom nodes, "OBNs") or at any other position in the water-column covering the explored subsurface formation.

The 1993 article "Wavenumber-based filtering of marine point-source data" by L. Amundsen (published in *Geophysics* No. 58 (9), pp. 1335-1348) and in the 1999 article "Removal of water-layer multiples from multicomponent sea-bottom data" by Osen et al. (published in *Geophysics* 64(3), pp. 838-851) use the seismic wavefield to characterize the seismic waves propagating through the water. The up-going wavefield is a part of the seismic wavefield and corresponds to waves propagating upward to a receiver, while the down-going wavefield is a part of the seismic wavefield and corresponds to waves propagating downward from the receiver. Given appropriately pre-conditioned measurements of the pressure (p) and vertical particle velocity ($v_z$) at the receiver, the acoustic wavefield separation into up-going (u) and down-going (d) components above the seafloor is given by $$\begin{bmatrix} u \\ d \end{bmatrix} = \frac{1}{2} \begin{bmatrix} 1 & -g\rho\omega/k_z \\ 1 & +g\rho\omega/k_z \end{bmatrix} \begin{bmatrix} p \\ v_z \end{bmatrix}, \qquad (1)$$

where $k_z$ is the vertical wavenumber at the receiver, ρ is the water density and ω is the angular frequency. The recorded wavefield, $v_z$, must be properly pre-conditioned to correct for any angular receiver response, spectral receiver response, and coupling to surrounding medium. Here, g represents a scalar or filter required to account for any residual effects (e.g., coupling) that inhibit the accuracy of wavefield separation. It is possible to produce the up-going and down-going wavefields by means other than linear combination of p and $v_z$, for example, by deghosting and manipulating a pressure wavefield, or by using recordings of velocity, displacement or acceleration.

In UDD, the subsurface formation's reflectivity is calculated to generate the up-going wavefield from the down-going wavefield. While the reflectivity should ideally be derived using a multi-dimensional deconvolution, it is more commonly estimated in the receiver domain using a layer-cake geology assumption (i.e., the subsurface formation is made of layers of distinct materials with horizontal interfaces there-between). Reflectivity is calculated starting from receiver domain space-time seismic data by: (1) transforming up-going and down-going space-time data (obtained from UDD) for a receiver gather into plane waves (using either an intercept-slowness, f-px-py, transform or a frequency-wavenumber, f-kx-ky, transform), (2) calculating a plane-wave reflectivity by dividing the up-going wavefield to the down-going wavefield, and (3) reverse-transforming the plane-wave reflectivity from plane waves back to the space-time domain.

In mathematical terms, the up-going wavefield, u, and down-going wavefield, d, in space-time domain are first transformed into the plane-wave domain, U and D, respectively (e.g., as described in the 1994 article "Discrete plane-wave decomposition by least-mean-square-error method" by O. Yilmaz and T. Taner published in *Geophysics* No. 59(6), pp. 973-982). The uddec-reflectivity, $R_{uddec}$, is calculated as $$R_{uddec} = \frac{U}{D + \varepsilon}$$

where ε is white noise and its presence prevents a potential division with a D that is zero. The resulting reflectivity $R_{uddec}$ is then reverse-transformed from the plane-wave domain into the space-time domain. The plane-wave transformation and up/down deconvolution may be applied to a common receiver gather, shot gather, or cross-spread gather, and may require additional corrections to compensate for phase/amplitude (e.g., a monopole correction) and datum.

Regardless of whether a multi-dimensional deconvolution or the above-described plane-wave domain implementation is used, the resulting reflectivity is limited by the illumination of the up-going wavefield, resulting in poor imaging in the shallow section. The poor imaging problem may affect both shallow and deep-water areas, and is a function of the acquisition parameters, such as the receiver spacing. The larger the receiver spacing, the further the illumination problem extends in depth. To overcome this limitation, Hampson and Szumski (in their 2020 article "Down/down deconvolution" published online as SB11 of *EAGE seabed seismic today: From acquisition to processing*) describe a down/down deconvolution (DDD) approach, which involves the plane-wave division of the source wavefield by the down-going wavefield followed by unity subtraction. An alternative formulation is given by WO 2021/167865 A1, in which the reflectivity (in this paper referred to as the first-order multiple reflection signal) is derived by a deconvolution between a down-going wavefield by a modified down-going wavefield. The modified down-going wavefield $d_w$ is obtained by subtracting the first arrival (also known as the water-wave, w) from space-time domain data, d: $d_w = d - w$. The down-going and the modified down-going space-time data (d and $d_w$) are then converted to the plane-wave domain, D and $D_w$ respectively. DDD reflectivity, $R_{dddec}$, is calculated as $$R_{dddec} = \frac{D_w}{D + \varepsilon} = \frac{D - W}{D + \varepsilon}$$

and then reverse-transformed from the plane-wave domain to the space-time domain.

FIG. 1 illustrates this DDD method. To simplify the description, the source ghost has been removed and the down-going ocean-bottom receiver data relating to sources at the free surface is considered to be equivalent to a source at the water-bottom which emits only upwards with receivers at the surface (an approach that is commonly referred to as reciprocity and is illustrated in the lower half of FIG. 1).

The acquired data, d, is illustrated in the leftmost cartoon, where the vertical down axis is time, and the detected signal is represented horizontally. The modified wavefield, $d_w$, illustrated in the next cartoon is obtained by subtracting the water-wave, w, from d. The water-wave w is the first arrival at the receiver and corresponds to a wave traveling upward through the water column to the receiver.

The water-wave is followed by the first-order multiple arrival, $m_1$, that corresponds to a wave traveling three times through the water column reaching the receiver after a reflection from the free-surface (i.e., water's top surface, its interface with air) and a second reflection from the water-bottom. The second order multiple, $m_2$, travels two more times through the water column. The surface-datum reflectivity, $r_{dddec}$ is obtained by dividing the modified down-going wavefield $d_w$ by the down-going wavefield, and it is illustrated in the right cartoon of FIG. 1.

The surface-datum reflectivity relates to the two-way travel path from the source datum, down to the water-bottom and back up to the source datum. This reflectivity may be seen as an operator converting the water-wave arrival, w, into the first order multiple arrival, $m_1$ and the first order multiple, $m_1$, into the second order multiple, $m_2$. In general, every arrival in d is converted into the following order of arrival in $d_w$. The reflectivity may either be processed from surface-datum, or redatumed to the water-bottom to be consistent with the up-going or down-going wavefield respectively. Additional corrections may be required to compensate for phase/amplitude distortions (e.g., a monopole correction).

The DDD approach requires attenuation of the water-wave from the down-going data, which may be achieved by debubbling/muting, or by subtraction of modelled water-wave arrivals (for example, based on notional source data derived from near-field hydrophone recordings as described in the 1982 article "The signature of an air gun array: Computation from near-field measurements including interactions" by A. Ziolkowski et al. (published in *Geophysics*, 47(10), pp. 1413-1421). In a down-going receiver gather, bubble-energy due to the direct arrival wave overlaps the reflection energy. The water-wave energy may be muted before or after debubble and/or source deghosting. Alternatively, the bubble energy may be estimated using notional sources from near-field hydrophone data and subtracted. The subtraction may be an adaptive subtraction.

Subtracting the water-wave from the down-going data is a limitation of the DDD technique. There is a need to overcome this limitation of DDD techniques, finding better methods for calculating the reflectivity. All the articles cited in this section are incorporated by references in their entirety.

An up/down deconvolution (UDD), illustrated in FIG. 2, is the spectral division of the up-going wavefield by the corresponding down-going wavefield in a plane-wave domain, such as the FK (frequency-wavenumber) or τP (intercept-slowness) domains. The plane-wave transforms are well known and described, for example, in the 1982 article "Plane-wave decomposition of seismograms" by Treitel et al. (published in *Geophysics* 47(10), pp. 1375-1401) and the 1994 article "Discrete plane-wave decomposition by least-mean-square-error method" by O. Yilmaz and M. H. Taner (*Geophysics* 59(6), pp. 975-982). The plane-wave transform and up/down deconvolution technique may be applied to a common receiver gather, shot gather, cmp (i.e., common mid-point) gather, or cross-spread gather.

After wavefield separation, UDD yields the underground structure's response, which is the reflectivity ($R_{ud}$), in the absence of a reflecting free surface (i.e., with free-surface demultiple) and without the source wavelet. The UDD is based on the assumption that incident plane-waves are reflected without alteration of the emerging wave-number as described, for example, in the 2001 article "Wavenumber-based filtering of marine point-source data" by L. Amundsen (published in *Geophysics*, 58(9), pp. 1335-1348). The reflectivity obtained using UDD is $$R_{ud} = -(\tilde{a}/2ik_z)(U/D)e^{ik_z\Delta_z}e^{ikh\Delta h},\qquad(2)$$

where $\tilde{a}$ is an arbitrary shaping filter, $i^2 = -1$, and uppercase denotes data transformed to the frequency domain. The phase shift terms apply a re-datuming to position the reflectivity at an arrival time equivalent to that with passage through a water column of depth $\Delta_z$, and to restore the lateral phase lost in deconvolution of data transformed around spatial origin $\Delta_h$ (for lateral wavenumber $k_h$). Formula (2) is also based on the assumption that source-side and receiver-side wavenumbers are laterally shift invariant. Recent examples of deep, structurally complex reflectors underlying a layer-cake overburden demonstrate that this assumption is not overly limiting in practice.

A multiple model, $M_{ud}$, may be generated by a convolution between the input data and the Green's function of the multiple path through the water column for water depth $\Delta_w$:

$$M_{ud} = -U(U/D)e^{2ik_z\Delta_w}.\qquad(3)$$

Although the redatuming operator in (3) again assumes lateral shift invariance, thus limiting its applicability, using model $M_{ud}$ has the advantage that it is close to true amplitude and often sufficiently accurate that it can be directly subtracted from the input without adaption filtering. Adaption filtering may also be used if required to improve the attenuation of multiples. The reflectivity produced by the spectral division U/D can be equivalently used to produce a model of multiples suitable for subtraction from the down-going wavefield by $M'_{ud} = -D(U/D)e^{2ik_z\Delta_w}$.

To account for subsurface structure, which invalidates the assumption that incident and emerging plane-waves are equal, a multi-dimensional wavefield deconvolution, MDD, may be used:

$$U(x_R, x_S^{\{i\}}, \omega) = \int_{Rec} D(x_R^{\{i\}}, x_S^{\{i\}}, \omega) R'_{ud}(x_R, x_R^{\{i\}}, \omega) dx_R^{\{i\}}$$
$$\qquad(4)$$

5 where $\omega$ is the angular frequency and (4) is in the frequency-space domain for receiver location $x_R$ ($x_R^{\{j\}}$ for j=1, ..., $N_R$) and shot location $x_S$ ($x_S^{\{i\}}$ for i=1, ..., $N_S$). The system of equations from all shots i can be solved directly for the reflectivity $R'_{ud}$ when $N_S \geq N_R$. Note the reflectivity is solved only for raypaths that connect the receivers with the other receivers in the array. This means that the output reflectivity estimate is limited to the receiver locations on the seabed, and is therefore limited in its practical use by the spacing of the receivers used in data acquisition. Because (4) is a summation across the receiver array, it is referred to as receiver-side MDD, denoted R-MDD.

SUMMARY

Methods and devices according to various embodiments use a down-going annihilation operator to generate an image of a water-covered subsurface formation subjected to a seismic survey.

According to an embodiment, there is a seismic exploration method including obtaining a down-going wavefield in a space-time domain from seismic data acquired by at least one receiver over a water-covered subsurface formation, estimating a water-wave in the space-time domain, deriving a down-going annihilation operator using the down-going wavefield and the estimated water-wave, and generating an image of the water-covered subsurface formation based on the down-going annihilation operator.

According to another embodiment there is a seismic data processing apparatus having an input/output interface and a data processing unit connected to the input/output interface. The input/output interface is configured to receive seismic data acquired by at least one receiver over a water-covered subsurface formation and to output an image of the water-covered subsurface formation. The data processing unit is configured to obtain a down-going wavefield in a space-time domain from the seismic data, to estimate a water-wave in the space-time domain, to derive a down-going annihilation operator in the time-space domain using the down-going wavefield and the estimated water-wave, and to generate the image of the water-covered subsurface formation based on the down-going annihilation operator.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flowchart of a method of seismic data processing using a down-going annihilation operator according to an embodiment;

FIG. 7 is a flowchart of a method combining the down-going annihilation operator with an up-down deconvolution result;

FIG. 8 is a flowchart of a method that uses an up-down deconvolution result to improve the estimate of the water-wave;

6

Figure 9:
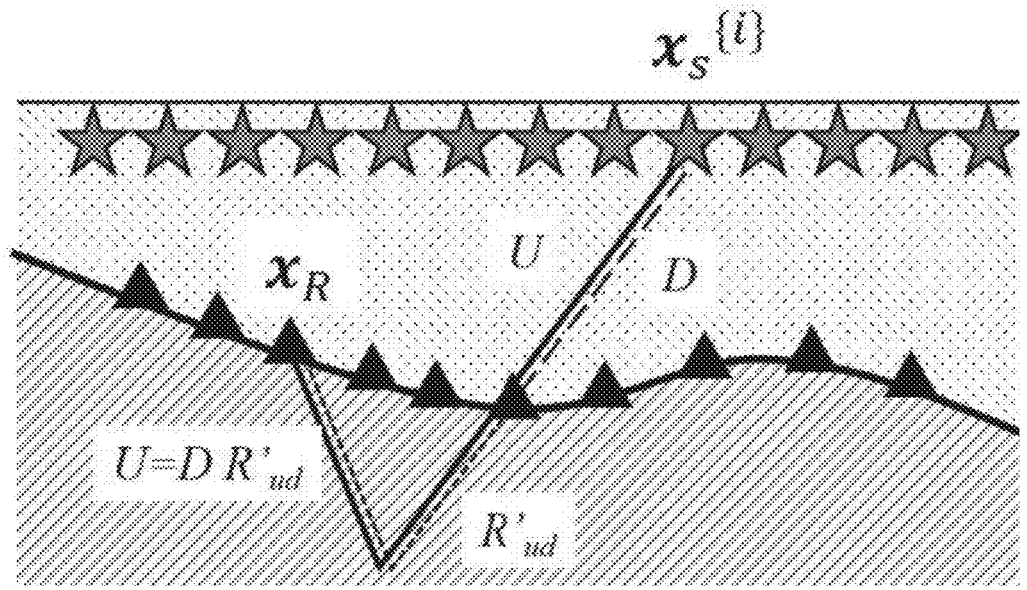
Figure 10:
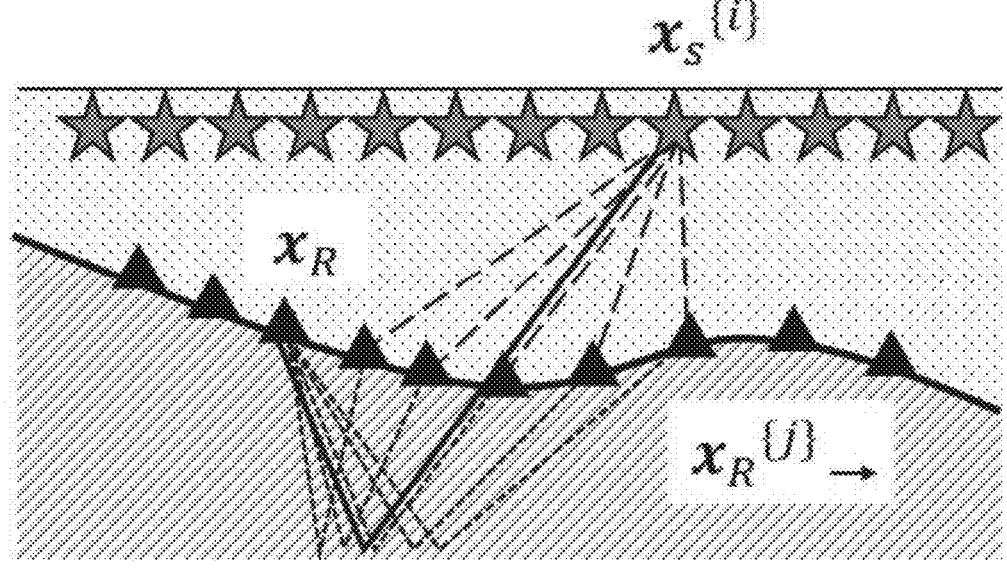
Figure 12:
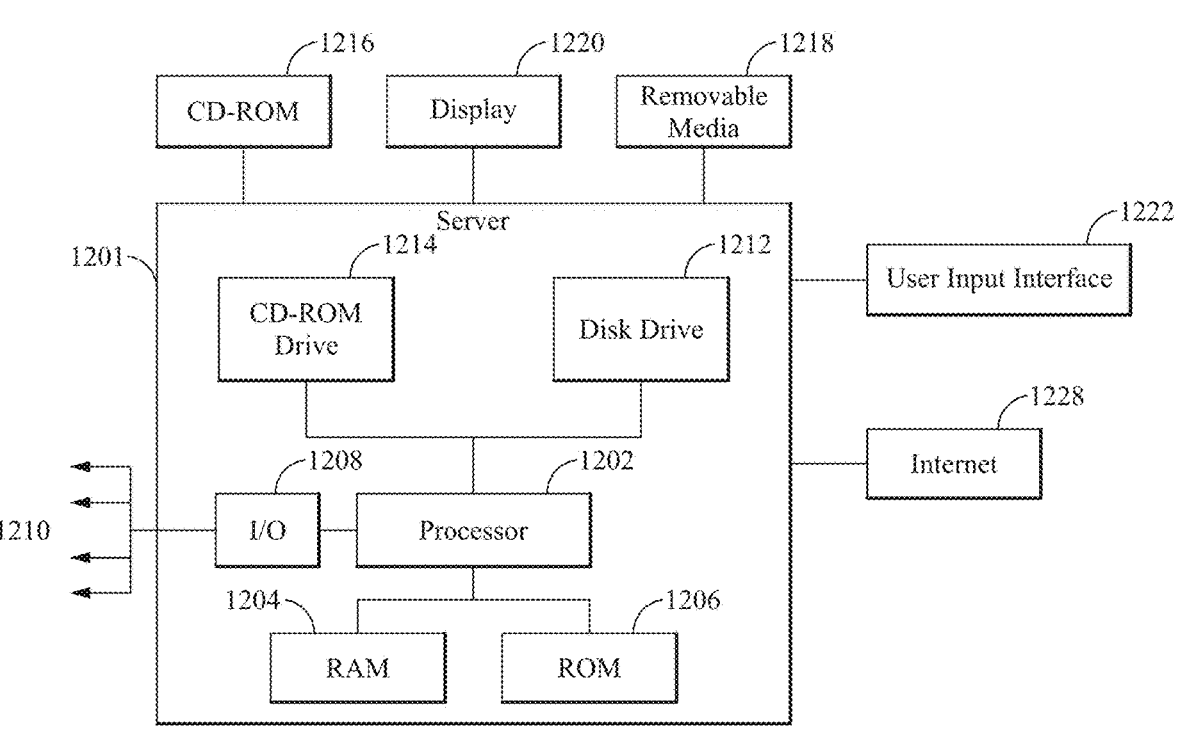

FIGS. 9 and 10 are cartoons illustrating the summing across the sources of seismic data;

FIG. 11 is a flowchart of a seismic data processing method according to another embodiment; and FIG. 12 is a block diagram of a seismic data processing apparatus, according to an embodiment.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Some of the methods and devices described hereinafter use a down-going annihilation operator approach to overcome conventional methods' limitations in removing the water-wave from the down-going data. Assuming a layer-cake geology, this down-going annihilation operator approach derives an annihilation operator that when applied to the down-going energy yields a water-wave prediction.

Figure 1:
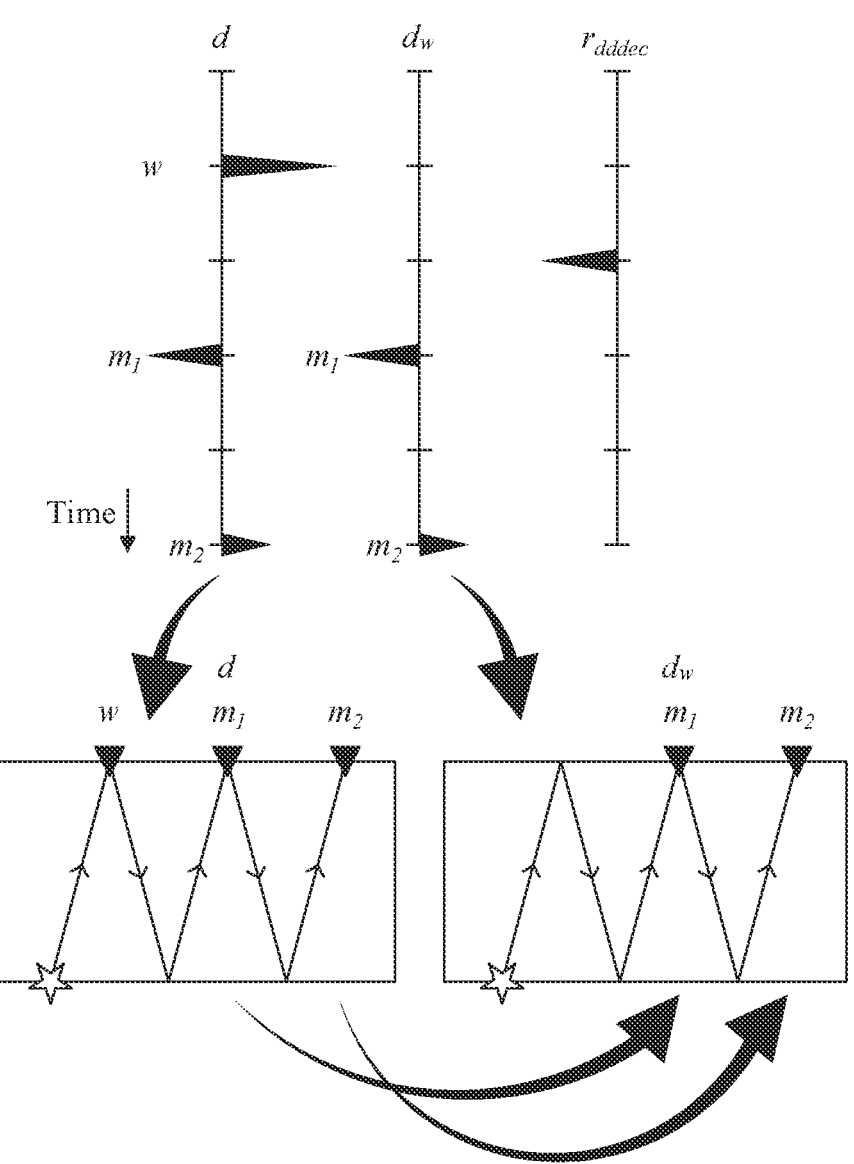
FIG. 1 illustrates the DDD technique.
Figure 2:
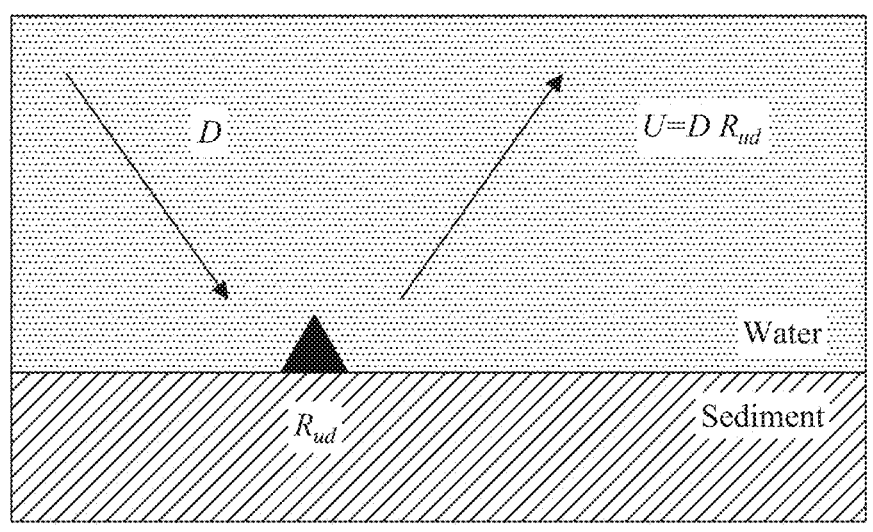
FIG. 2 illustrates meaning of the UDD technique.
Figure 3:
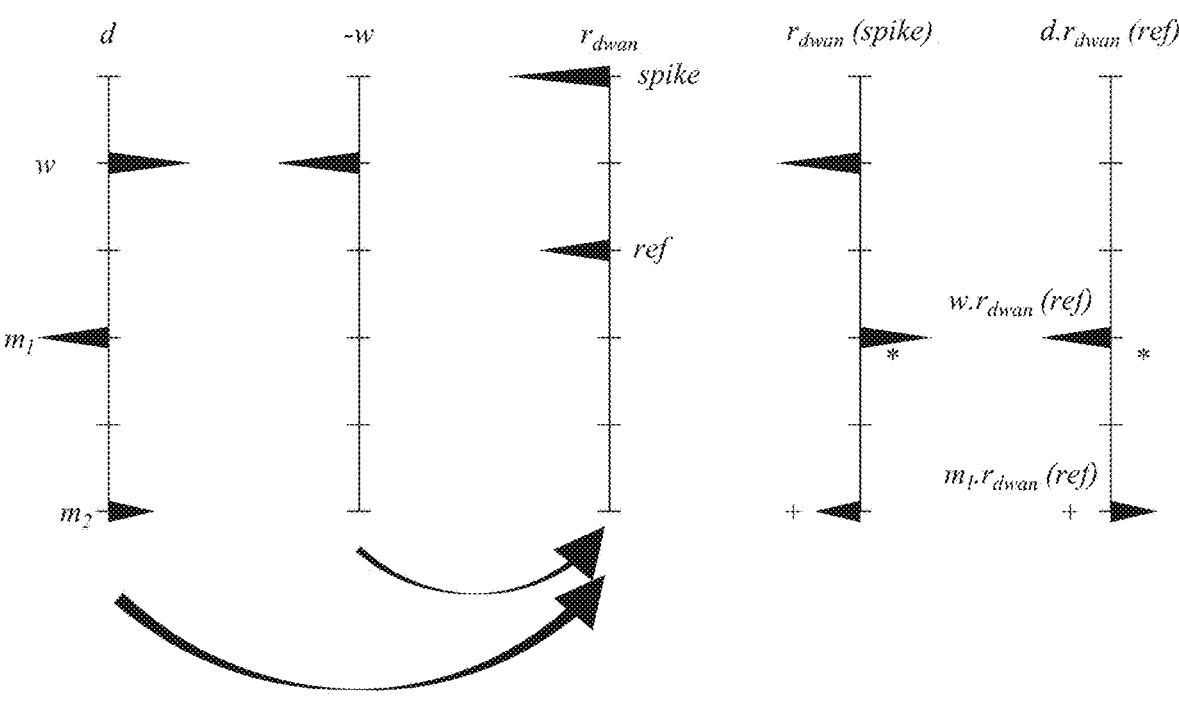
FIG. 3 is a set of cartoons that illustrates a down-going annihilation operator's derivation according to an embodiment.

FIG. 3 illustrates the annihilation operator's derivation using five cartoons representing time vertically increasing downward and signal amplitudes horizontally.

The leftmost cartoon represents a down-going trace (including water-wave), the second cartoon from left to right represents a reverse water-wave and the middle cartoon represents the derived down-going annihilation operator consisting of a spike followed by the reflectivity, $r_{dwan}$. The fourth and fifth cartoons illustrate contributions corresponding to the $r_{dwan}$ spike term and the $r_{dwan}$ ref term, respectively. The fourth from left to right represents the result of the down-going wave, d, convolved with the initial spike in the down-going annihilation operator, $r_{dwan}$(spike). This convolution relates to reversing the polarity of the input data, i.e., $d \cdot r_{dwan}$(spike)=−d. The reflectivity term of the down-going annihilation operator, $d \cdot r_{dwan}$(ref), which relates to a time-shift, may be scaled, and polarity of the input down-going data may be reversed. When these two terms are added ($r_{dwan}$=$d \cdot r_{dwan}$(spike)+$d \cdot r_{dwan}$(ref)), the lower two arrivals (* and +) cancel out yielding a reverse-polarity version of the water-wave. This down-going annihilation operator ($r_{dwan}$) may be used for further processing and imaging to create an image of the subsurface. Further processing may attenuate the spike term, for example by muting in a time-space domain, with the remaining reflectivity term being used directly for imaging or to predict and attenuate multiples of the down-going space-time data.

Note that, in practice, reversing the polarity of the water-wave can be avoided. If the water-wave is used without reversing polarity, the resulting annihilation-operator also has reverse polarity, $-r_{dwan}$.

Figure 4:
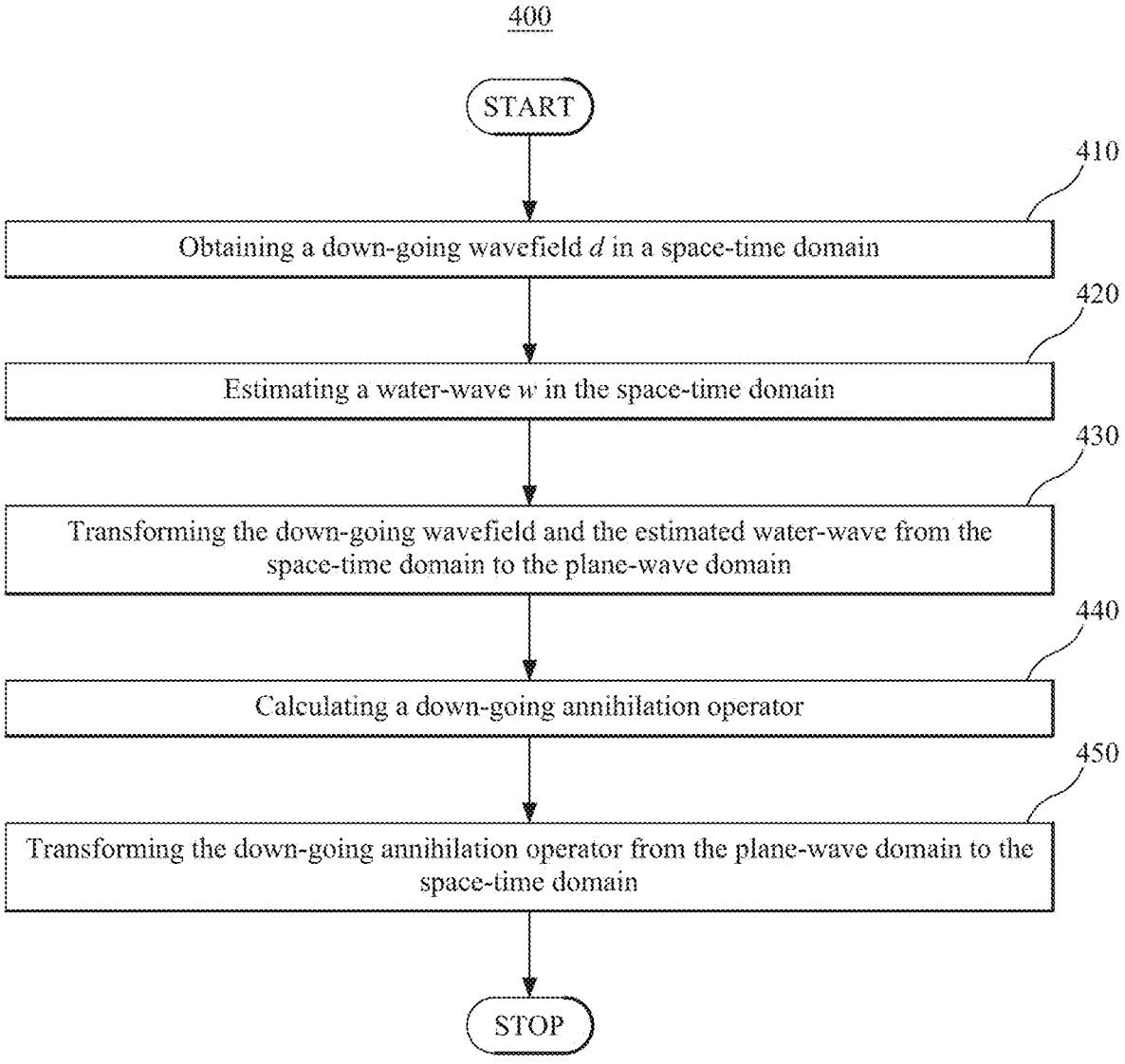
FIG. 4 is a flowchart of a method for deriving a down-going annihilation operator according to an embodiment.

Thus, as illustrated in FIG. 4, a method (400) for deriving a down-going annihilation operator (that when applied to the down-going energy, yields a water-wave prediction) includes the following steps: obtaining a down-going wavefield d in a space-time domain at 410; estimating a water-wave w in the space-time domain at 420; transforming the down-going wavefield and the estimated water-wave from the space-time domain to the plane-wave domain (yielding D and W, respectively) at 430. Method 400 further includes, at 440, calculating the down-going annihilation operator, $R_{dwan}$, by dividing the estimated water-wave in the plane-wave domain to a sum of the down-going wavefield in the plane-wave domain and a noise term, $\varepsilon$, that is $$R_{dwan} = \frac{W}{D + \varepsilon}.$$

Finally, at 450, the down-going annihilation operator, $R_{dwan}$, is transformed from the plane-wave domain to the space-time domain.

The input down-going wavefield may be after source de-bubbling (i.e., removing bubble effect of air guns by convolution with a debubbling operator) and/or source deghosting (i.e., removing source ghosts caused by emitted seismic waves traveling to the water-surface before propagating toward the seabed). The water-wave may be estimated from the down-going wavefield (e.g., by muting) or may be modelled by notional sources coming from nearfield hydrophone data. Alternatively, the water-wave and down-going wavefield may be obtained using source-primary and source-ghost arrivals.

Figure 5:
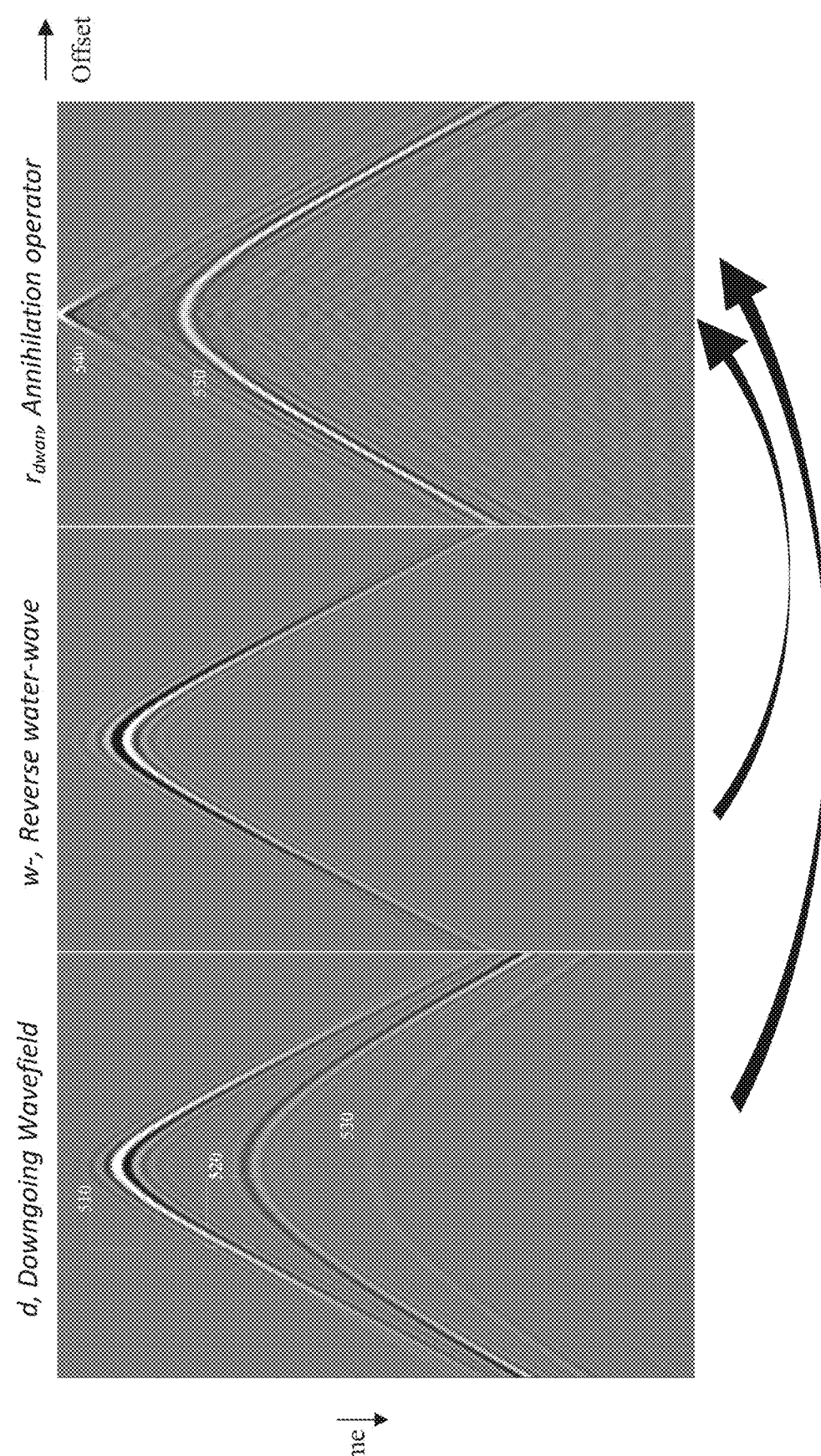
FIG. 5 is a set of related graphs illustrating deriving a down-going annihilation operator using modelled data.

FIG. 5 is a series of related graphs (with time vertically and offset horizontally, the offset being the source-detector distance) illustrates deriving a down-going annihilation operator using modelled data for a horizontal water-bottom at 108 m depth and a propagation velocity of 1500 m/s in the water layer. Consistent with the cartoons in FIG. 4, the down-going data illustrated in the leftmost graph represents the down-going wavefield including the water-wave 510 followed (at later times) by primary and first order multiple, 520 and 530, respectively. The middle graph illustrates the water-wave only. The down-going annihilation operator in the rightmost graph includes a spike term followed by the reflectivity. The down-going data and the water-wave include a source ghost, whereas the ghost is not present in the down-going annihilation operator, as expected. The down-going annihilation operator consists of the spike-term 540 followed by the reflectivity-term 550. The spike term has a V-shaped appearance because the plane-wave decomposition was limited to a minimum velocity of 1500 m/s.

The down-going annihilation operator may be used for further processing to obtain a structural image of the underground formation. As described earlier, the spike term from the down-going annihilation operator may be removed, for example by muting, the remaining energy being then used for multiple prediction. The raw output may be processed directly from surface-datum or may be redatumed (i.e., transformed to correspond to a different detector depth and thus a shifted in time, for example by applying a phase shift in the frequency-wavenumber domain) to the seabed for consistency with the down-going or up-going wavefield. Additional terms may be required to compensate for phase/ amplitude (e.g., monopole correction).

The above-described down-going annihilation operator approach has been tested in the receiver-gather plane-wave domain, making a layer-cake geology assumption. Alternatively, a multi-dimensional deconvolution approach may be adopted. This alternative approach, which is described later in this document, involves deriving a down-going annihilation operator, $R_{dwan}$, such that, when it is convolved/integrated with (or applied to) the down-going wavefield, D', it yields a reverse-polarity water-wave.

The down-going annihilation operator approach may be used for ocean-bottom or towed streamer data and, based on reciprocity theory, may be applied in the shot-domain, receiver-domain, or with multi-dimensional deconvolution down-going annihilation operators. It may also be applied in the cross-spread domain or the cmp domain.

The down-going wavefield may be obtained using hydrophone and vertical-geophone recordings (e.g., PZ-minus, where P is for pressure, for example, measured by a hydrophone, and Z is vertical velocity, for example measured by a geophone). Hydrophone-only deghosting approaches may also be used.

FIG. 6 is a flowchart of a method (600) of seismic data processing using a down-going annihilation operator according to an embodiment. Method 600 includes: obtaining seismic data in a space-time domain, the seismic data being acquired by at least one receiver over a water-covered subsurface formation at 610; separating a down-going wavefield (and, optionally, also an up-going wavefield) from the seismic data at 620; estimating a water-wave in a space-time domain from the down-going wavefield at 630; deriving a down-going annihilation operator using the down-going wavefield and the estimated water-wave, at 640; and generating an image of the water-covered subsurface formation using the down-going annihilation operator at 650. Steps 610-650 are performed using the various techniques described in this section.

The down-going annihilation operator consists of a spike-term followed by a reflectivity. Alternative or additionally, the down-going wavefield and the water-wave may be transformed from space-time domain to a plane-wave domain, the down-going annihilation operator being then derived in the plane-wave domain and then being then reverse-transformed to the space-time domain.

In the space-time domain, the down-going annihilation operator may be further processed to attenuate the spike-term, for example, by muting. The water-wave arrival may be modified with an inversion process so that the spike term may better resemble the reverse plane-wave transform of a unit-spike.

The down-going annihilation operator may be subsequently used to model multiple reflections, for example, by attenuating the spike term from the down-going annihilation operator and then convolving the spike-attenuated down-going annihilation operator with a down-going wavefield. The down-going annihilation operator may also be used to estimate a velocity model of the subsurface.

The down-going annihilation operator may be used to process seismic data gathered using any type of data acquisition, such as, ocean-bottom surveys (node or cable), towed-streamer surveys, VSP/DAS (vertical seismic profiling/distributed acoustic sensing) data, near field hydrophone data, sensors attached to buoys or drifting in the water column. The seismic data may be multi-component (e.g., hydrophone, vertical and/or horizontal geophone/accelerometers) or single-component (e.g., only hydrophone). Any seismic source type may be used: airgun, sparker, boomer, vibrator (land or marine), dynamite, etc. The acquired seismic data may be subject to debubbling and/or source/receiver deghosting.

The down-going annihilation operator approach may be implemented in a plane-wave transform domain of a common receiver gather, common shot gather, common midpoint gather, or cross-spread gather with the assumption that the source-side and receiver-side plane-waves are laterally

9 invariant. Furthermore, it may be implemented as part of an integral equation, for which the assumption of laterally invariant wavenumbers is not required.

In one embodiment, method 600 further includes comparing the down-going annihilation operator with a unit-spike to derive a modified water-wave and then using the modified water-wave to rederive the down-going annihilation operator. Alternatively, method 600 may further include obtaining an up-going wavefield corresponding to the seismic data, applying an up-down deconvolution using the up-going wavefield and the down-going wavefield to generate an up-down deconvolution reflectivity, and comparing the up-down deconvolution reflectivity with the annihilation operator to update the water-wave. The updated water-wave may be used to rederive annihilation operator.

The water-wave may be derived based on geometrical superposition of notional source data or a source signature. The notional source or source signature data may be derived (1) using a package such as Nucleus or Gundalf, (2) from in-field measurements such as nearfield hydrophone data using the technique described in the 1982 article "The signature of an air gun array" by Ziolkowski et al. (published in Geophysics 47(10), pp 1413-1421), (3) from direct arrival or water-wave arrivals using the technique described in the 2015 article "Far-field source signature reconstruction using direct arrival data" Davison, C. and Poole, G (available to the public as Th N116 15 paper presented at 77th EAGE Conference & Exhibition), etc. Nucleus is a modeling software package that uses sensor and source geometries, filters, structural and petrophysical information to modelled seismic data for a targeted subsurface formation. Gundalf is another software package for airgun source modelling that uses information on the acquisition geometry and gun types to generate a source signature usable for seismic data signature deconvolution. The superposition may include a source-primary and a source-ghost, a geometric spreading term, recording-response filter, and source/receiver array filters. Alternatively, the water-wave may be derived based on muting or filtering of the down-going wavefield.

In one embodiment useful for situations in which the water-wave signature is not known or is poorly defined, the water-wave estimate, w, may be generalized to filter and thus shorten the waveform of the data produced by the annihilation-filter deconvolution. By shortening the waveform, the spike term and the reflectivity term of the down-going annihilation operator are more easily separated in space and time, and the spike term may be attenuated by muting. The filter may be determined with an iterative scheme, for example, using the conjugate gradient or steepest descent method, by requiring that the energy in a space-time window above the reflectivity and in the region occupied by the spike term more closely resembles the plane-wave transform (e.g., frequency-wavenumber or frequency-slowness) of a zero-phase spike in a least squares sense. Different norms may be used to measure the degree to which the energy in this space-time window resembles the desired plane-wave limitation (dip limitation) of a zero-phase spike. In one embodiment, the filter w may itself be a zero-phase spike, in which case the annihilation-filter deconvolution produces the inverse of the down-going wavefield and $$R_{dwan} = \frac{1}{D + \varepsilon}.$$

10

In this case $R_{dwan}$ may have an anti-causal component to its waveform, spreading energy into the space time domain at earlier times than the onset of the spike term. To help evaluate this a-causal energy, the annihilation-filter w may be updated to apply a time-shift for time T (e.g., a frequency-domain multiplication by exp(−iωT)) allowing the anti-causal energy to be easily evaluated in the time-space domain.

In one embodiment, the down-going annihilation operator result is combined with an up-down deconvolution result. For example, method 700 illustrated in FIG. 7 includes: deriving an up-down deconvolution result in the space-time domain using an up-going wavefield and a down-going wavefield at 710, migrating the up-down deconvolution result at 720, deriving an annihilation operator in the space-time domain using a water-wave wavefield and a down-going wavefield at 730, migrating the annihilation operator at 740, and combining the migrated up-down deconvolution result and the migrated annihilation operator at 750. The combining may involve tapering the two terms as a function of depth, e.g., annihilation operator migration in the shallow and up-down deconvolution migration in the deep.

Up-down deconvolution suffers from poor shallow illumination but is independent from knowledge of the water-wave. Down-going annihilation operators offer improved shallow illumination but are dependent on knowledge of the water-wave.

In one embodiment, an up-down deconvolution result is used to improve the estimate of the water-wave. For example, method 800 illustrated in FIG. 8 includes: receiving an up-going wavefield and a down-going wavefield in a space-time domain at 810, computing an up-down deconvolution reflectivity in a space-time domain using the up-going wavefield and the down-going wavefield at 820, receiving a water-wave wavefield at 830, computing a down-going annihilation operator in a space-time domain using the water-wave wavefield and a down-going wavefield at 840, and deriving a convolutional filter to predict the up-down deconvolution reflectivity space-time data from the space-time domain annihilation operator data at 850. Method 800 further includes using the convolutional filter to calculate an improved water-wave wavefield at 860 and then calculating an improved down-going annihilation operator in the space time domain using the improved water-wave wavefield and the down-going wavefield at 870.

The up-down deconvolution reflectivity may be redatumed to match the timing of the down-going annihilation operator. Alternate or additionally, the up-down deconvolution reflectivity and the down-going annihilation operator may be migrated, and a shaping operator may be derived in the migration domain. In one embodiment, a dip-limited spike may be added to the up-down deconvolution reflectivity prior to deriving the shaping operator. The dip-limited spike is attenuated from the down-going annihilation operator prior to deriving the shaping operator. The dip-limited spike may relate to the frequency-wavenumber or frequency-slowness deconvolution response of a spike. The result may also include re-datuming and the monopole correction.

An alternative approach works by summing across the sources and is known as source-side MDD, S-MDD. FIGS. 9 and 10 are cartoons illustrating the summing across the sources. In FIG. 9, receiver located at $x_R$ records energy emitted from a source at location $x_S$. The upgoing arrival (U), solid line, is modelled as the convolution of the down-going (D), dashed line, with the reflectivity (R'$_{ud}$), dotted line. In FIG. 10, to complete the model, the convolutions are </columns> summed across the array of receivers indexed by j. The summation across j is repeated for each shot, indexed by i, in the dataset.

The S-MDD is a structurally different approach, although the equations are similar in form to (4). The S-MDD is able to estimate both the subsurface reflectivity and a multiple model for subtraction from the input. Notably, S-MDD does not assume equivalence of incident and emergent wavenumbers and is able to work in the presence of subsurface structure. Note that the S-MDD reflectivity is estimated from the down-going wavefield only, in direct contrast to R-MDD which requires both up-going and down-going wavefields.

S-MDD is based on an integral equation written in terms of the down-going wavefield. The water wave is removed from the down-going wavefield D to produce a partial down-going wavefield $D_u$:

$$D_u = D - S \qquad (5)$$

with S corresponding to a directional output of a source, $\varphi$, calculated at some distance from its geophysical center, the signature arriving with its source ghost being computed as $S = \varphi(1 - e^{ik_z\Delta_s})$ (this phase-shift re-ghosting operator is normally applied in the frequency-wavenumber domain, with $k_z$ being the wavenumber in the depth direction) for source depth $\Delta_s/2$ below the free surface.

In one embodiment, the partial wavefield $D_u$ is de-ghosted on the source side (i.e., the source ghost is removed). Meanwhile, the full down-going wavefield, D, including the water wave, is also separated from the source ghost, but this time it is the source ghost that is used for S-MDD (as opposed to the de-ghosted primary). The source de-ghosted partial wavefield $D_u$ is denoted $D_u'$, while the source ghost of the down-going wavefield D is denoted D'.

The S-MDD model equates the source de-ghosted partial down-going wavefield $D_u'$ to the source ghost of the down-going wavefield D' after convolution with the subsurface reflectivity $R'_{dd}$. The reflectivity $R'_{dd}$ describes the subsurface response for a wavefield propagating from the source location emitting $D_u'$ to the source location emitting D', and contains no free-surface effects since it is evaluated from an array of sources below the free surface. For angular frequency $\omega$, the integral equation is written $$D_u'(x_R^{\{i\}}, x_S, \omega) = \int_{Src} D'(x_R^{\{i\}}, x_S^{\{j\}}, \omega) R'_{dd}(x_S, x_S^{\{j\}}, \omega) \, dx_{S\{i\}} \qquad (6)$$

where receiver locations are $x_R^{\{i\}}$ with $i=1, \ldots, N_R$, and source locations are $x_S^{\{j\}}$ with $j=1, \ldots, N_S$. The S-MDD integral summing across surface source locations. Each receiver in the dataset provides an equation of the type in (6). The system of equations from all receivers can therefore be solved directly for the reflectivity $R'_{dd}$ when $N_R \geq N_S$. Note the reflectivity is found for raypaths that connect the sources with other sources in the array. This means that the output reflectivity estimate corresponds to the locations of the sources near the surface.

The advantage of S-MDD in (6), compared with R-MDD in (4), is that the subsurface reflectivity $R'_{dd}$ is found on a set of surface source locations which are often dense in a modern seismic survey using ocean-bottom receivers. This means the source-side reflectivity $R'_{dd}$ provides more information for the subsurface image than the receiver-side reflectivity which is limited to the often-sparse receiver locations.

In an extension of the S-MDD method, the source ghost of the down-going wavefield (D') can be replaced in (6) with the down-going wavefield (D), and the source de-ghosted partial wavefield ($D_u'$) can be replaced with $D_u$. The system of equations can then be used to find the reflectivity $R'_{dd}$ without source de-ghosting of the input data, rendering data preparation workflow simpler. Omitting the source de-ghosting implicitly assumes that the take-off angle (and therefore the source ghosting) of $D_u$ is equal to the take-off angle of D. Experience shows that this is a reasonable approximation in many if not all real-world cases.

In terms of body-wave reflections, the reflectivity $R'_{dd}$ maps each set of down-going arrivals in D, starting with the down-going water wave, to the set of source-side peg-leg multiples in $D_u$, starting with the water-bottom reflection. The reflectivity can therefore be used to produce a multiple model $M_u$ suitable for subtraction from the up-going wavefield:

$$M_u(x_R^{\{i\}}, x_S, \omega) = \int_{Src} U(x_R^{\{i\}}, x_S^{\{j\}}, \omega) R'_{dd}(x_S, x_S^{\{j\}}, \omega) \, dx_S^{\{j\}} \qquad (7)$$

Equivalently, a multiple model ($M_d$) suitable for subtraction from the down-going wavefield may be calculated as $$M_d(x_R^{\{i\}}, x_S, \omega) = \int_{Src} D(x_R^{\{i\}}, x_S^{\{j\}}, \omega) R'_{dd}(x_S, x_S^{\{j\}}, \omega) \, dx_S^{\{j\}} \qquad (8)$$

The multiple models can be subtracted directly, with some pre-conditioning including the use of a mute, or adaptively with a set of filters.

If $N_R \leq N_S$, the system of equations in (6) can be solved with some level of additional conditioning or regularization. In one embodiment, the system of equations (6) is iteratively solved as an inversion via a conjugate gradient or steepest descent solver, with regularization achieved by limiting the number of iterations thereby avoiding over-fitting the data. In one embodiment, the system of equations (6) is solved using a singular value decomposition used to produce a pseudo-inverse of the down-going in D'. By limiting the number of singular values used to produce the pseudo-inverse, $R'_{dd}$ can be estimated in under-determined cases.

The set of equations in (6) is solved in the angular frequency domain, frequency-space domain, or the time domain. In the time-domain, a set of sparseness weights or mutes may further constrain the solution, for example, by prohibiting energy in the expected water column of $R'_{dd}$. To enable successful solution for all frequencies, data preparation should include anti-alias filtering in a domain suitable for summation across shots. The shot locations in the summation can be as-acquired, or after interpolation and/or regularization to a set of pre-plot or gridded shot locations. To accelerate convergence to the solution of (6), and to avoid artefacts in $R'_{dd}$ relating to very wide-angle arrivals, the summation across source locations can be limited to include source locations inside an aperture, defined as an area of source locations around location $x_S$.

Although the above-described methods used the down-going wavefield, an equivalent formulation may be applied to the up-going wavefield, the full seismic wavefield recorded on the hydrophone component, the full seismic wavefield recorded on the geophone component, or a combination of these. In such cases $D_u$ is replaced in (6) by $W_u$ and D is replaced by W. Now $W_u$ and W are generic wavefield identifiers for versions of the input data that are distinguished by their data preparation. For example, in cases where W=U, W=P or W=$V_Z$, the input data does not contain an isolated source signature that can be removed. The simplest alteration is to include a mute in the data preparation to remove water wave and primary reflections arriving before the first water-bottom multiple, resulting in $W_u$ being a muted version of W. In this implementation, the inversion is required to find a reflectivity that maps the water wave and primary arrivals in W to the next order of multiples in $W_u$, and so on for higher order multiple arrivals (generally, mapping arrival of order N to order N+1). The muting applied to the input data prevents the trivial solution in which $R'_{dd}$ is a unit spike. Alternatively, by re-datuming such that $W_u = We^{-2ik_z\Delta_w}$ the reflectivity $R'_{dd}$ can again map order N arrivals to order N+1 while avoiding the trivial solution by limiting the temporal length of the reflectivity operator and/or requiring it to be purely causal. This is closely related to solving for the case $W_u = W$ while enforcing a mute or gap on $R'_{dd}$ to inhibit appreciable reflectivity prior to the expected travel-time of water-column reflections.

Equation (9) gives the formulation for the multi-dimensional down-going annihilation operator:

$$-W(x_R^{\{i\}},\omega) = \int_{Src} D'(x_R^{\{i\}},x_S^{\{j\}},\omega) R_{dwan}(x_S,x_S^{\{j\}},\omega) dx_S^{\{j\}}. \tag{9}$$

In this formulation, the unknown annihilation operator, $R_{dwan}$, is found such that when it is multi-dimensionally convolved by the downgoing wavefield, D', the reverse-polarity water-wave, −W, is predicted.

The S-MDD and the related multiple model use the down-going wavefield to estimate a reflectivity from the array of surface source locations with an integral formulation that accounts for subsurface structure. This differs from the recently published down/down deconvolution (DDD) method which assumes equivalence of source-side and receiver-side wavenumbers. Furthermore, although the data preparation for S-MDD requires the direct water wave to be removed as per DDD, further steps are then required for the proper implementation of S-MDD, relating to source-side deghosting of the down-going wavefields used for input. The described S-MDD differs from the multi-dimensional up/down deconvolution method R-MDD by evaluating the reflectivity on the source side, as opposed to the receiver side. This difference is significant as it requires summation over source locations instead of receiver locations, and outputs the reflectivity on the dense source locations instead of the sparse receiver locations. The input datasets are up-going and down-going wavefields for the R-MDD and pre-processed down-going wavefields only for S-MDD. The data preparation stages, as well as the conceptual model, ensure that the S-MDD and R-MDD methods are distinct.

FIG. 11 illustrates an MDD technique 1100 that includes: receiving a first seismic dataset and a second dataset corresponding to a plurality of receiver locations and a plurality of source excitations, the first dataset including a water wave, and a second dataset not including the water wave at 1110; deriving a surface-consistent multi-dimensional deconvolution operator that models the second seismic dataset from the first seismic dataset using a convolutional sum over an aperture of source locations at 1120, and generating an image of the subsurface using the surface-consistent multi-dimensional deconvolution operator at 1130.

Method 1100 may be applied to: (a) the first seismic dataset and the second seismic dataset recorded by seismic sensors mounted on a towed streamer, or (b) the first seismic dataset and the second seismic dataset are recorded by seismic sensors located on the seabed. The first seismic dataset and the second seismic dataset may correspond to at least one of a receiver-side down-going wavefield, a receiver-side up-going wavefield, a hydrophone measurement, a geophone measurement, a particle acceleration measurement, or a particle velocity measurement.

Method 1100 may be characterized by deriving the surface-consistent multi-dimensional deconvolution operator by solving a linear system of equations. The linear system of equations may be solved using an iterative solver or a pseudo-inverse.

The image of the subsurface may be generated using the surface-consistent multi-dimensional deconvolution operator to attenuate multiples in the second seismic dataset. The surface-consistent multi-dimensional deconvolution operator may be used to estimate predicted surface-related multiples. The predicted surface-related multiples may be used to attenuate free-surface multiples in a received seismic dataset, which is subsequently used to generate an image of the subsurface.

The first seismic dataset and the second seismic dataset may correspond to receiver-side down-going wavefields, and then the surface-consistent multi-dimensional deconvolution operator is used to attenuate multiples on a receiver-side up-going wavefield. The direct water wave may be attenuated in the first seismic dataset to generate the second seismic dataset.

The first seismic dataset may correspond to a source-side ghost arrival. The second seismic dataset corresponds to a source-side primary arrival.

The above-discussed methods may be implemented in a computing device 1200 as illustrated in FIG. 12. Hardware, firmware, software or a combination thereof may be used to perform the various steps and operations of the above-described methods/techniques.

Computing device 1200 suitable for performing the activities described in the exemplary embodiments may include a server 1201. Server 1201 may include a central processor (CPU or GPU) 1202 coupled to a random-access memory (RAM) 1004 and to a read-only memory (ROM) 1206. ROM 1206 may also be other types of storage media to store programs, such as programmable ROM (PROM), erasable PROM (EPROM), etc.

Processor 1202 may communicate with other internal and external components through input/output (I/O) circuitry 1208 and bussing 1210 to provide control signals and the like. I/O input circuitry 1208 is configured to receive seismic data acquired by at least one receiver over the explored water-covered subsurface formation. Processor 1202 carries out a variety of functions as are known in the art, as dictated by software and/or firmware in, processor 1202 is configured (1) to obtain a down-going wavefield in a space-time domain from the seismic data, (2) to estimate a water-wave in the space-time domain, (3) to derive a down-going annihilation operator in the time-space domain using the down-going wavefield and the estimated water-wave, and (4) to generate the image of the water-covered subsurface formation based on the down-going annihilation operator.

Server 1201 may also include one or more data storage devices, including hard drives 1212, CD-ROM drives 1216 and other hardware capable of reading and/or storing information, such as DVD, etc. In one embodiment, software for carrying out the above-discussed steps may be stored and distributed on a CD-ROM or DVD 1216, a USB storage device 1218 or other form of media capable of portably storing information. These storage media may be inserted into, and read by, devices such as CD-ROM drive 1214, disk drive 1212, etc. Server 1201 may be coupled to a display 1220, which may be any type of known display or presentation screen, such as LCD, plasma display, cathode ray tube (CRT), etc. Display 1220 may be configured to display images of the explored water-covered subsurface formation. A user input interface 1222 is provided, including one or more user interface mechanisms such as a mouse, keyboard, microphone, touchpad, touch screen, voice-recognition system, etc.

Server 1201 may be coupled to other devices, such as sources, detectors, etc. The server may be part of a larger network configuration as in a global area network such as the Internet 1228, which allows ultimate connection to various computing devices.

The embodiments described in this section set forth seismic data processing using a down-going annihilation operator. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A seismic exploration method for determining presence and location of underground resources, the method comprising:

obtaining a down-going wavefield D in a space-time domain from seismic data acquired by at least one receiver over a water-covered subsurface formation;

estimating a water-wave W in the space-time domain;

deriving a down-going annihilation operator $R_{dwan}$ which when applied to the down-going wavefield D yields the estimated water-wave W as $R_{dwan}=W/(D+\varepsilon)$ where $\varepsilon$ is a noise term; and generating an image of the water-covered subsurface formation based on the down-going annihilation operator, the image indicating presence and location of the underground resources in the water-covered subsurface formation.

2. The method of claim 1, wherein the deriving of the down-going annihilation operator includes:

transforming the down-going wavefield and the estimated water-wave from the space-time domain to a plane-wave domain;

calculating the down-going annihilation operator using the plane-wave down-going wavefield and the plane-wave estimated water-wave; and transforming the down-going annihilation operator from the plane-wave domain to the space-time domain.

3. The method of claim 1, further comprising:

comparing the down-going annihilation operator with a unit-spike to derive a modified water-wave; and using the modified water-wave to rederive the down-going annihilation operator.

4. The method of claim 1, further comprising applying at least one of debubbling and source deghosting to the down-going wavefield.

5. The method of claim 1, wherein the water-wave is estimated from the down-going wavefield by muting.

6. The method of claim 1, wherein the water-wave is modelled using nearfield hydrophone data.

7. The method of claim 1, further comprising redatuming the space-time down-going annihilation operator.

8. The method of claim 1, further comprising:

obtaining an up-going wavefield;

applying an up-down deconvolution using the up-going wavefield and the down-going wavefield to generate an up-down deconvolution reflectivity; and comparing the up-down deconvolution reflectivity with the down-going annihilation operator to derive a modified water-wave; and using the modified water-wave to rederive the down-going annihilation operator.

9. The method of claim 1, wherein the down-going wavefield is computed by a combination of hydrophone data and a vertical particle velocity data.

10. The method of claim 1, wherein the down-going annihilation operator is calculated using a multi-dimensional deconvolution.

11. A seismic data processing apparatus for determining presence and location of underground resources, the apparatus comprising:

an input/output interface configured to receive seismic data acquired by at least one receiver over a water-covered subsurface formation and to output an image of the water-covered subsurface formation; and a data processing unit connected to the input/output interface and configured to obtain a down-going wavefield D in a space-time domain from seismic data acquired by at least one receiver over a water-covered subsurface formation;

to estimate a water-wave W in the space-time domain;

to derive a down-going annihilation operator $R_{dwan}$ which when applied to the down-going wavefield D yields the estimated water-wave W as $R_{dwan}=W/(D+\varepsilon)$ where $\varepsilon$ is a noise term; and to generate an image of the water-covered subsurface formation based on the down-going annihilation operator, the image indicating presence and location of the underground resources in the water-covered subsurface formation.

12. The seismic data processing apparatus of claim 11, wherein the data processing unit derives of the down-going annihilation operator by:

transforming the down-going wavefield and the estimated water-wave from the space-time domain to the plane-wave domain;

calculating the down-going annihilation operator using the plane-wave down-going wavefield and the plane-wave estimated water-wave; and transforming the down-going annihilation operator from the plane-wave domain to space-time domain.

13. The seismic data processing apparatus of claim 11, wherein the data processing unit is further configured to compare the down-going annihilation operator to a unit-spike to derive a modified water-wave, and to use the modified water-wave to rederive the down-going annihilation operator.

14. The seismic data processing apparatus of claim 11, wherein the data processing unit is further configured to apply at least one of debubbling and source deghosting to the down-going wavefield.

15. The seismic data processing apparatus of claim 11, wherein the data processing unit estimated the water-wave from the down-going wavefield by muting.

16. The seismic data processing apparatus of claim 11, wherein the data processing unit estimates the water-wave using nearfield hydrophone data.

17. The seismic data processing apparatus of claim 11, wherein the data processing unit is further configured to perform redatuming of the space-time down-going annihilation operator.

18. The seismic data processing apparatus of claim 11, wherein the data processing unit is further configured:

to obtain an up-going wavefield, to apply an up-down deconvolution using the up-going wavefield and the down-going wavefield to generate an up-down deconvolution reflectivity to compare the up-down deconvolution reflectivity with the down-going annihilation operator to derive a modified water-wave, and to rederive the down-going annihilation operator using the modified water-wave.

19. The seismic data processing apparatus of claim 11, wherein the down-going wavefield is computed by a combination of hydrophone data and a vertical particle velocity data.

20. The seismic data processing apparatus of claim 11, wherein the data processing unit calculates the down-going annihilation operator using multi-dimensional deconvolution.

\* \* \* \* \*